Dec. 23, 1952 J. C. STUDEBAKER 2,622,503
WIND DIRECTOR
Filed Feb. 28, 1949
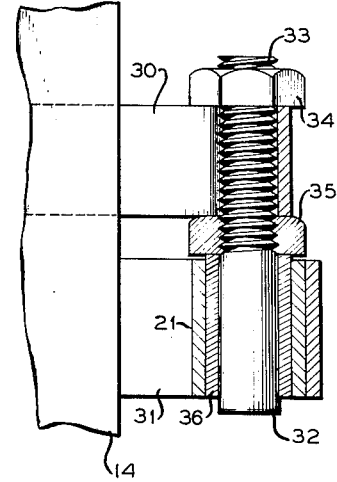
FIG. 4
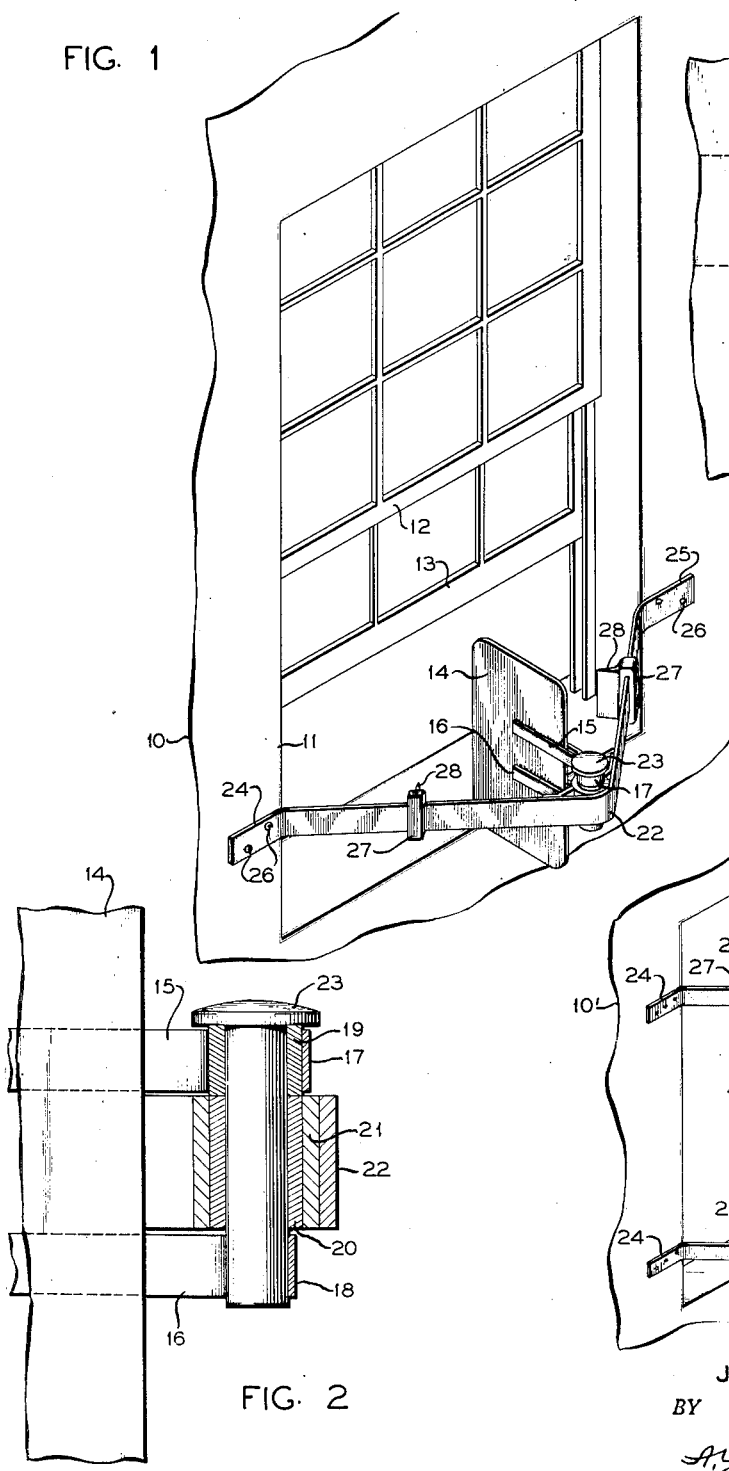
FIG. 1
FIG. 2
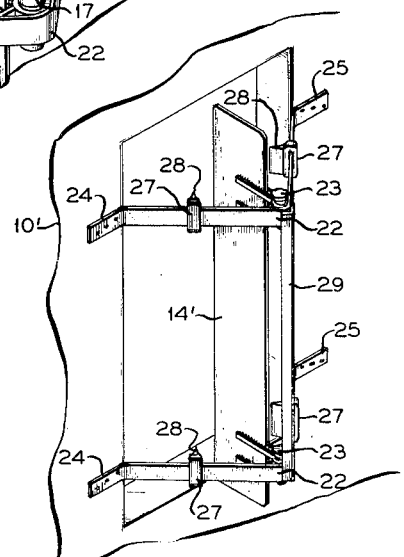
FIG. 3
INVENTOR.
J. C. STUDEBAKER
BY
A. Yates Dowell
ATTORNEY Patented Dec. 23, 1952

2,622,503

UNITED STATES PATENT OFFICE 2,622,503

WIND DIRECTOR

John C. Studebaker, Jones, Mich.

Application February 28, 1949, Serial No. 78,702

2 Claims. (98—44)

This invention relates to ventilating and air-conditioning, and more particularly to a wind director for influencing or directing the natural movement of air. Numerous and sundry devices have been used for modifying climatic conditions some of which require only natural forces to operate while others require motive power of one kind or another.

Air circulation frequently is advantageous in accelerating evaporation and causing heat and moisture transfer, thereby promoting desirable characteristics of temperature and humidity, as well as other advantages.

Slight wind or air movement affords relief to man and beast in habitable quarters including those for living and sleeping and this and other reasons make it desirable to promote air circulation.

It is an object of the invention to provide a simple and inexpensive device, capable of being easily produced and readily applied for diverting wind into a building from the exterior through a window or other opening.

A further object of the invention is to provide a device which will direct wind blowing across an opening no matter from which side of the opening the wind is blowing, as well as to provide a device which will not interfere with the wind blowing directly toward the opening.

Briefly, the invention comprises transverse supporting means extending across a window or other opening, and having pivotally mounted substantially centrally of the window in a substantially vertical position a relatively thin wind deflecting member or vane providing a relatively large surface area, and with stopping means for limiting the swinging movement of the latter, as well as for adjusting it to the desired maximum angle of deflection.

Further objects and advantages of the invention will be apparent from the following description taken in conjunction with the drawings, wherein:

Fig. 1 is a perspective illustrating the application of the invention to the window of the building;

Fig. 2, an enlarged fragmentary detail illustrating the mounting for the deflector;

Fig. 3, a view similar to that of Fig. 1 illustrating multiple supporting means for the deflector, when used commercially in, for example, a corn storage bin or the like; and Fig. 4, an enlarged fragmentary detail illustrating a modified type of mounting for the deflector.

With continued reference to the drawings, a building 10 is provided with a window opening 11 in which there are upper and lower movable sashes 12 and 13 of conventional construction. When the sashes are in the position shown means is provided for deflecting air blowing across the window opening, such means comprising a deflector plate or vane 14 having a relatively large surface area for contact by wind blowing across the window opening. The deflector 14 is pivotally supported in upright position from its outer edge by means of hinge members 15 and 16 having eye or loop portions 17 and 18, a bearing 19 being disposed within the loop 17 and being adapted to rest upon a similar bearing 20, carried by a bearing collar 21 brazed or otherwise secured to a transverse support 22. The eyes 17 and 18 of the hinge members 15 and 16 are located above and below the member 21, with the upper eye 17 extending around the bearing member 19 and overlaying the cylindrical bearing 21, and with the parts held together by means of a pin or pintle 23. The deflector may easily be removed by lifting out the hinge pin, for cleaning or changing the size thereof. The transverse support 22 includes a pair of angularly disposed legs terminating in feet 24 and 25 adapted to be secured to the building 10 by means of screws or other fastening means 26.

In order to limit the deflector plate or vane 14 from swinging into engagement with the legs of the supports 22 and thereby making a noise or causing damage to be done to either part, a pair of resilient bumpers 27 are provided having slots or apertures for reception of the legs of the support 22, and having relatively thin deflector engaging tips 28 for further resiliency upon contact by a particularly hard gust of wind. The bumpers 27 are slidable along the plates to the desired position, thereby permitting the user to determine the maximum desired angle at which the deflector plate or vane 14 will stop at for more perfect conditions within the building.

It will be readily understood that the present invention is applicable to openings of any size, from the smallest to the largest. It is particularly appropriate for use on corn cribs and other storage bins, tobacco curing sheds, or wherever needed for human comfort, and wherever moving air is desirable for the curing of crops, for livestock, for paint or volatile liquid storage, or for other purposes.

Also, as disclosed, a single hinge may be provided for supporting a comparatively small deflector 14, as shown in Fig. 1, or multiple hinges for supporting a deflector 14' as shown in Fig. 3, wherein the entire opening in the side of a building 10' may be ventilated. This type of vane is desirable for use in warehouses where tobacco or other items are being cured, and a reasonably frequent change of air is required.

Where multiple hinges are employed they are preferably connected by means of a bar 29, and such bar as illustrated in Fig. 3 is preferably of angular construction in cross section with one part disposed at right angles to the other. Further, this bar may be welded or otherwise connected to hinge members 22.

As shown in Fig. 4, a type of hinge member is employed which permits the vane to be lifted freely from its operative position. In this embodiment, hinge members 30 and 31 are employed and to the upper hinge member 30 a pintle or hinge pin 32 is secured, the pintle having threads 33 on which are received spaced lock nuts 34 and 35 and between which the outer end of the hinge member 30 is clamped. When the vane deflector 14 is merely lifted, the pintle 32 will be disengaged from the lower hinge member 31. If desired, in order to reduce friction, a bearing sleeve 36 may be mounted in a bearing collar similar to the collar 21 and may be brazed or otherwise secured within the hinge member 31 and when the parts are assembled the nut 35 will rest upon this bearing sleeve.

It will be obvious to those skilled in the art that various changes may be made in the invention without departing from the spirit and scope thereof, and therefore the invention is not limited by that which is shown in the drawings and described in the specification, but only as indicated in the appended claims.

What is claimed is:

1. A relatively thin wind deflecting member having a relatively large surface area, means for rotatably mounting said member in upright position in front of an opening comprising a support having angularly disposed arms, the ends of said arms being adapted to be secured at opposite sides of said opening with the apex of the angle between the arms positioned outwardly of the opening, a bearing collar with a vertical axis secured to said arms within the apex of said angle, hinge members secured to said deflecting member adjacent one vertical edge thereof and having loop portions extending outwardly above and below said bearing collar, a second bearing secured in one of said loop portions in alignment with said bearing collar, a hinge pin extending through said bearings and lower loop for rotatably mounting said deflecting member between said arms, and bumper members each having an inwardly extending tapered projection, said bumper members being provided with an aperture for receiving said arms and being slidably mounted on said arms for adjustably limiting the angle of movement of said deflecting member.

2. A relatively thin wind deflecting member having a relatively large surface area, means for rotatably mounting said member in upright position in front of an opening comprising a support having angularly disposed arms, the ends of said arms being adapted to be secured at opposite sides of said opening with the apex of the angle between the arms positioned outwardly of the opening, a bearing collar with a vertical axis secured to said arms within the apex of said angle, hinge members secured to said deflecting member adjacent one vertical edge thereof and having loop portions extending outwardly above and below said bearing collar, a second bearing secured in one of said loop portions in alignment with said bearing collar, a hinge pin extending through said bearings and lower loop for rotatably mounting said deflecting member between said arms, a bumper slidably mounted on each arm of the support and each projecting inwardly and movable from a position adjacent the apex to a position adjacent the free end of the arm, each bumper having a portion engageable with the deflector whereby the extent of pivotal movement of the deflector in each direction may be independently controlled for obtaining the desired wind deflecting conditions.

JOHN C. STUDEBAKER.

REFERENCES CITED

The following references are of record in the file of this patent:

UNITED STATES PATENTS

| Number | Name | Date |
|---|---|---|
| 830,829 | Goman | Sept. 11, 1906 |
| 874,521 | March | Dec. 24, 1907 |
| 1,791,494 | Fraser | Feb. 10, 1931 |
| 2,395,848 | Clayton | Mar. 5, 1946 |
| 2,453,561 | Wolff | Nov. 9, 1948 |